US012743179B2

(12) United States Patent
Yamaguchi et al.

(10) Patent No.: US 12,743,179 B2
(45) Date of Patent: Sep. 22, 2026

(54) TOUCH SENSOR

(71) Applicant: Panasonic Intellectual Property Management Co., Ltd., Osaka (JP)

(72) Inventors: Ryo Yamaguchi, Osaka Fu (JP); Xiaofeng Lu, Osaka Fu (JP); Tetsuya Minamide, Osaka Fu (JP); Mitsuru Satou, Kanagawa Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/870,262

(22) PCT Filed: Apr. 10, 2023

(86) PCT No.: PCT/JP2023/014571
§ 371 (c)(1),
(2) Date: Nov. 27, 2024

(87) PCT Pub. No.: WO2023/233824
PCT Pub. Date: Dec. 7, 2023

(65) Prior Publication Data

US 2025/0335060 A1 Oct. 30, 2025

(30) Foreign Application Priority Data

May 31, 2022 (JP) ................................ 2022-089070

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
CPC .................... G06F 3/0446; G06F 2203/04112
See application file for complete search history.

(56) References Cited

U.S. PATENT DOCUMENTS 9,459,747 B2 * 10/2016 Donnelly .............. G06F 3/0445
10,073,573 B2 * 9/2018 Satou .................... G06F 3/0447
10,261,638 B2 * 4/2019 Hwang ................. G06F 3/0443
10,739,929 B2 * 8/2020 Lee ....................... G06F 3/0446
(Continued)

FOREIGN PATENT DOCUMENTS

JP 2014-186716 A 10/2014
JP 2018-022512 A 2/2018
(Continued)

OTHER PUBLICATIONS

International Search Report dated Jun. 6, 2023 issued in International Patent Application No. PCT/JP2023/014571, with English translation.

*Primary Examiner* — Amy Onyekaba
(74) *Attorney, Agent, or Firm* — Rimon P.C.

(57) ABSTRACT

Each sensor electrode includes transmission electrodes extending in a first direction, and reception electrodes extending in a second direction. Each of the transmission electrodes and the reception electrodes includes a mesh pattern formed by arranging a plurality of cells. Each cell has a quadrangular shape formed by a first diagonal and a second diagonal longer than the first diagonal. Each sensor electrode is configured so that the second diagonal extends in an extending direction of the sensor electrodes.

2 Claims, 10 Drawing Sheets

(56) References Cited

U.S. PATENT DOCUMENTS

| | | | | |
|---|---|---|---|---|
| 2013/0341070 | A1* | 12/2013 | Kim | G06F 3/0446 174/250 |
| 2014/0231120 | A1* | 8/2014 | Nakamura | H05K 1/0296 174/253 |
| 2015/0123942 | A1* | 5/2015 | Huang | G06F 3/0446 345/174 |
| 2015/0177872 | A1* | 6/2015 | Kim | G06F 3/04166 345/174 |
| 2015/0193034 | A1* | 7/2015 | Jeong | G06F 3/0445 345/173 |
| 2015/0378477 | A1* | 12/2015 | Yoshiki | H05K 1/0298 345/174 |
| 2017/0177118 | A1* | 6/2017 | Nukui | G06F 3/0446 |
| 2017/0269728 | A1* | 9/2017 | Donnelly | G06F 3/0443 |
| 2019/0332205 | A1 | 10/2019 | Nukui | |
| 2019/0377457 | A1* | 12/2019 | Nakayama | G06F 3/0445 |
| 2020/0033999 | A1* | 1/2020 | Xie | G06F 3/0447 |
| 2020/0117295 | A1* | 4/2020 | Nakayama | H01B 5/14 |
| 2020/0142542 | A1* | 5/2020 | Kuriki | G06F 3/0445 |
| 2020/0249796 | A1* | 8/2020 | Hara | H10K 59/352 |
| 2020/0285348 | A1* | 9/2020 | Nakayama | G06F 3/047 |
| 2021/0403769 | A1* | 12/2021 | Kiyoto | G06F 3/041 |
| 2022/0004282 | A1* | 1/2022 | Lee | G06F 3/0446 |
| 2022/0171503 | A1 | 6/2022 | Nakayama et al. | |
| 2022/0261114 | A1* | 8/2022 | Kwon | G06F 3/0445 |
| 2025/0335060 | A1* | 10/2025 | Yamaguchi | G06F 3/044 |

FOREIGN PATENT DOCUMENTS

| | | | |
|---|---|---|---|
| JP | 2020-021184 | A | 2/2020 |
| WO | 2019/021760 | A1 | 1/2019 |

* cited by examiner 1
2
2a
2b
3
12(10)
20
7
20
7
12
(10)
11
(10)
100

31
31
11
11
33 33
33
34
33 33
33
2
31
31
11
11
X
Y 12
12
12
12
32
3
32
33
33
33
33
32
35
32
X
Y

EW1
EW1
12
12
12
EP
IX
EW2
32
32
32
31
11
31
11
3
X
Y 3
5
4
20
24
21
23
22
6

TOUCH SENSOR

CROSS-REFERENCE TO RELATED APPLICATIONS

This application is the U.S. National Phase under 35 U.S.C. § 371 of International Patent Application No. PCT/JP2023/014571, filed on Apr. 10, 2023, which in turn claims the benefit of Japanese Application No. 2022-089070, filed on May 31, 2022, the entire disclosures of which applications are incorporated by reference herein.

TECHNICAL FIELD

The present invention relates to a touch sensor.

BACKGROUND ART

For example, a touch sensor of capacitance type disclosed in Patent Document 1 has been known.

Specifically, Patent Document 1 discloses a touch sensor of capacitance type including a plurality of first mesh electrodes and a plurality of second mesh electrodes. Each first mesh electrode includes a plurality of metal thin wires on the front surface of the film substrate. Each second mesh electrode includes a plurality of metal thin wires on the back surface of the film substrate.

The first mesh electrodes extend in one direction (the TD-direction shown in FIG. 4 of Patent Document 1) and are arranged in parallel in the direction orthogonal to the extending direction of the first mesh electrodes (the MD-direction shown in FIG. 4 of Patent Document 1). The second mesh electrodes extend in the MD-direction and are arranged in parallel in the TD-direction.

CITATION LIST

Patent Document

Patent Document 1: Japanese Unexamined Patent Publication No. 2018-22512

SUMMARY OF THE INVENTION

Technical Problem

In general, in the touch sensor of Patent Document 1, the electrodes on the front surface of the film substrate function as reception electrodes, whereas the electrodes on the back surface of the film substrate function as reception electrodes. Thus, the second mesh electrodes of Patent Document 1 are hereinafter referred to as "transmission electrodes," and the first mesh electrodes as "reception electrodes."

Each of the transmission electrodes and the reception electrodes includes a mesh pattern formed by arranging a plurality of cells formed by a plurality of fine lines that are conductive. Each cell has a rhombic shape (see FIG. 3 of Patent Document 1). This rhombus consists of two imaginary diagonals, the longer one of which extends in the MD-direction. That is, in the transmission electrodes, the longer diagonal constituting the cell extends in the extending direction of the transmission electrodes, whereas in the reception electrodes, the shorter diagonal constituting the cell extends in the extending direction of the reception electrodes.

In this configuration, in the transmission electrodes, a relatively smaller number of cells are arranged in the extending direction (the MD-direction), whereas in the reception electrodes, a relatively larger number of cells are arranged in the extending direction (the TD-direction). Accordingly, the reception electrodes have a larger number of intersections of the fine lines in the extending direction (the TD-direction). More specifically, the reception electrodes have a longer conductive path in the extending direction thereof. As a result, the resistance value of one of the electrodes (the reception electrode) becomes greater than that of the other one of the electrodes (the transmission electrode).

The present disclosure was made in view of the above problem, and an object of the present disclosure is to lower the resistance values of both the transmission electrodes and the reception electrodes.

Solution to the Problem

In order to achieve the above object, a touch sensor according to an embodiment of the present disclosure includes a plurality of sensor electrodes, wherein the plurality of sensor electrodes include a plurality of transmission electrodes extending in a first direction, and a plurality of reception electrodes extending in a second direction orthogonal to the first direction and arranged to intersect with the transmission electrodes. Each of the transmission electrodes and the reception electrodes includes a mesh pattern formed by arranging a plurality of cells formed by a plurality of fine lines that are conductive. Each of the plurality of cells has a quadrangular shape formed by a first imaginary diagonal and a second imaginary diagonal longer than the first diagonal. Each sensor electrode is configured so that the second diagonal extends in an extending direction of the sensor electrodes.

Advantages of the Invention

According to the present disclosure, the resistance values of both the transmission electrodes and the reception electrodes can be lowered.

DESCRIPTION OF EMBODIMENTS

An embodiment of the present disclosure will be described below with reference to the drawings. Note that the following description of the embodiment is merely an example in nature, and is not intended to limit the scope, applications, or use of the present disclosure.

Figure 1:
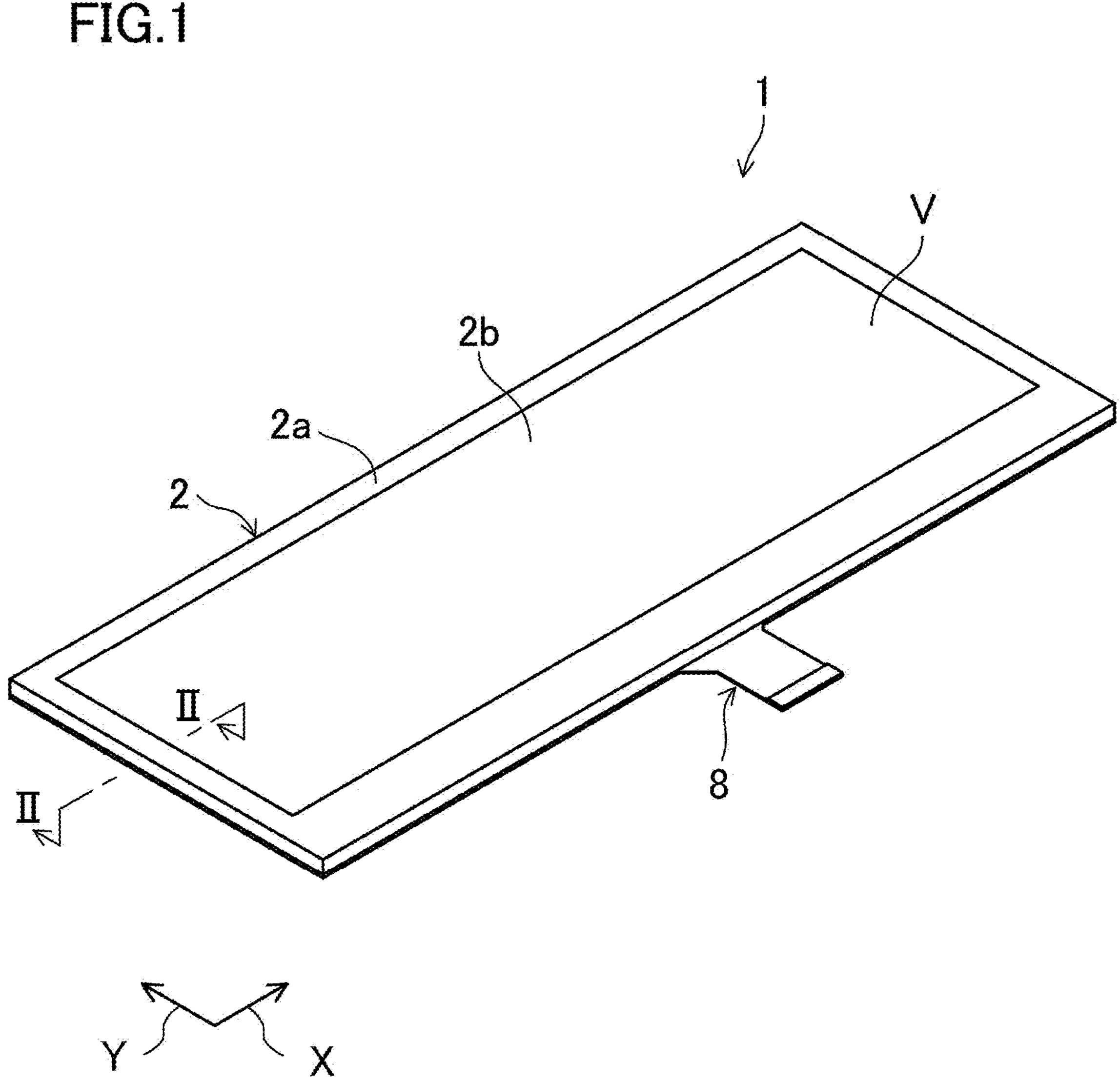
FIG. 1 is an overall perspective view of a touch sensor according to an embodiment of the present disclosure.

FIG. 1 shows the whole of a touch sensor 1 according to an embodiment of the present disclosure. The touch sensor 1 is a sensor type input device of a capacitance type applied to a display 100 (see FIG. 2). The touch sensor 1 is used as an input device for, for example, an in-vehicle device such as a car navigation system, a display device of a personal computer, a mobile phone, a portable information terminal, a portable game machine, a copying machine, a ticket vending machine, an automatic teller machine, a clock, or the like. In particular, the touch sensor 1 is suitable for a large display.

In the following description, the side on which an operation screen 2*b* of a cover member 2 (see, e.g., FIGS. 1 and 2), which will be described later, is located will be referred to as a "front" of the touch sensor 1, and its opposite side will be referred to as a "back" of the touch sensor 1. With these terms, the positional relationships between the elements constituting the touch sensor 1 will be defined. In this embodiment, for the sake of description, the direction from left to right in FIG. 3 is defined as "a first direction X," and the direction from bottom to top in FIG. 3 is defined as "a second direction Y."

(Cover Member)

Figure 2:
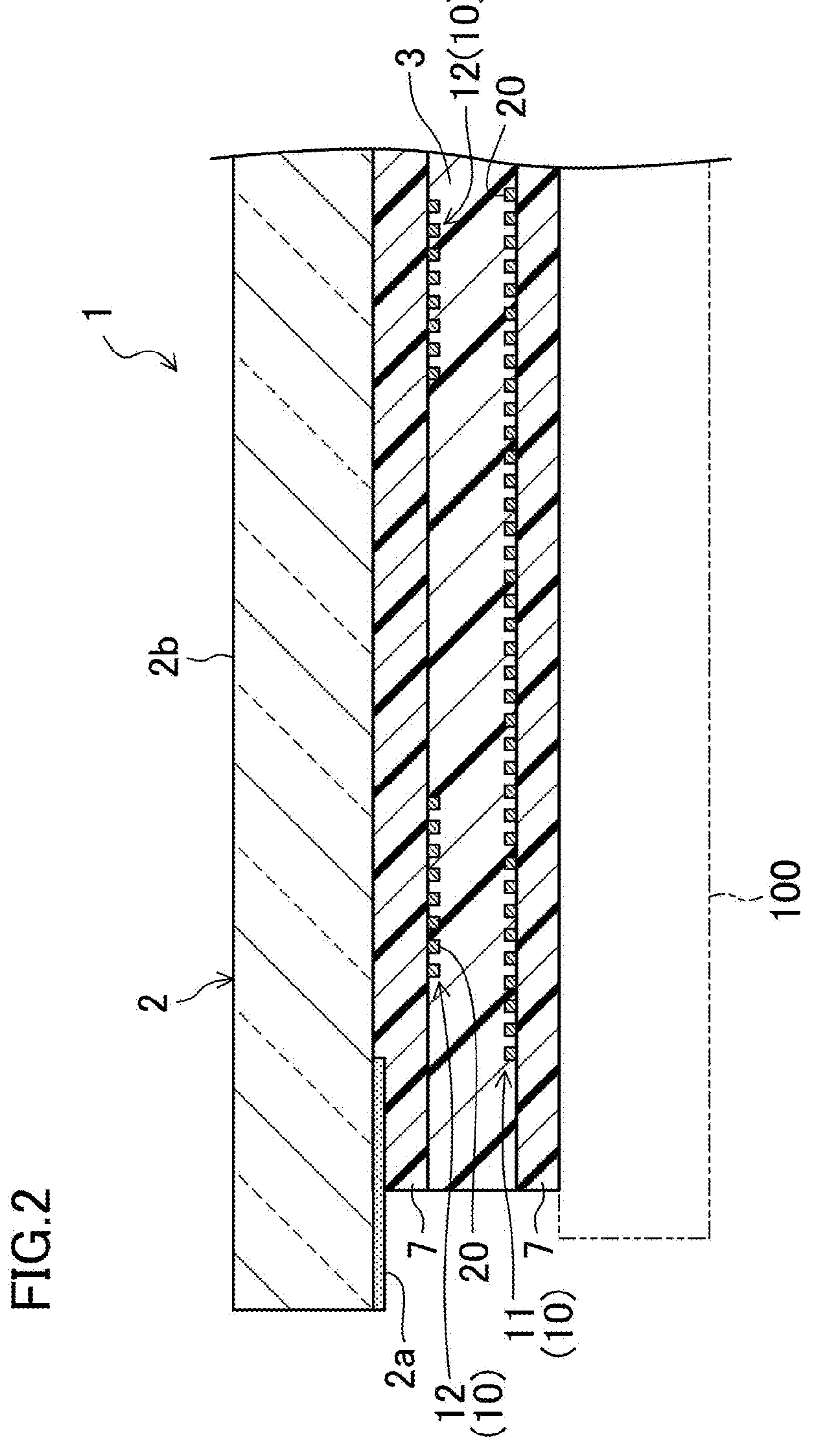
FIG. 2 is a cross-sectional view taken along line II-II of FIG. 1.
Figure 3:
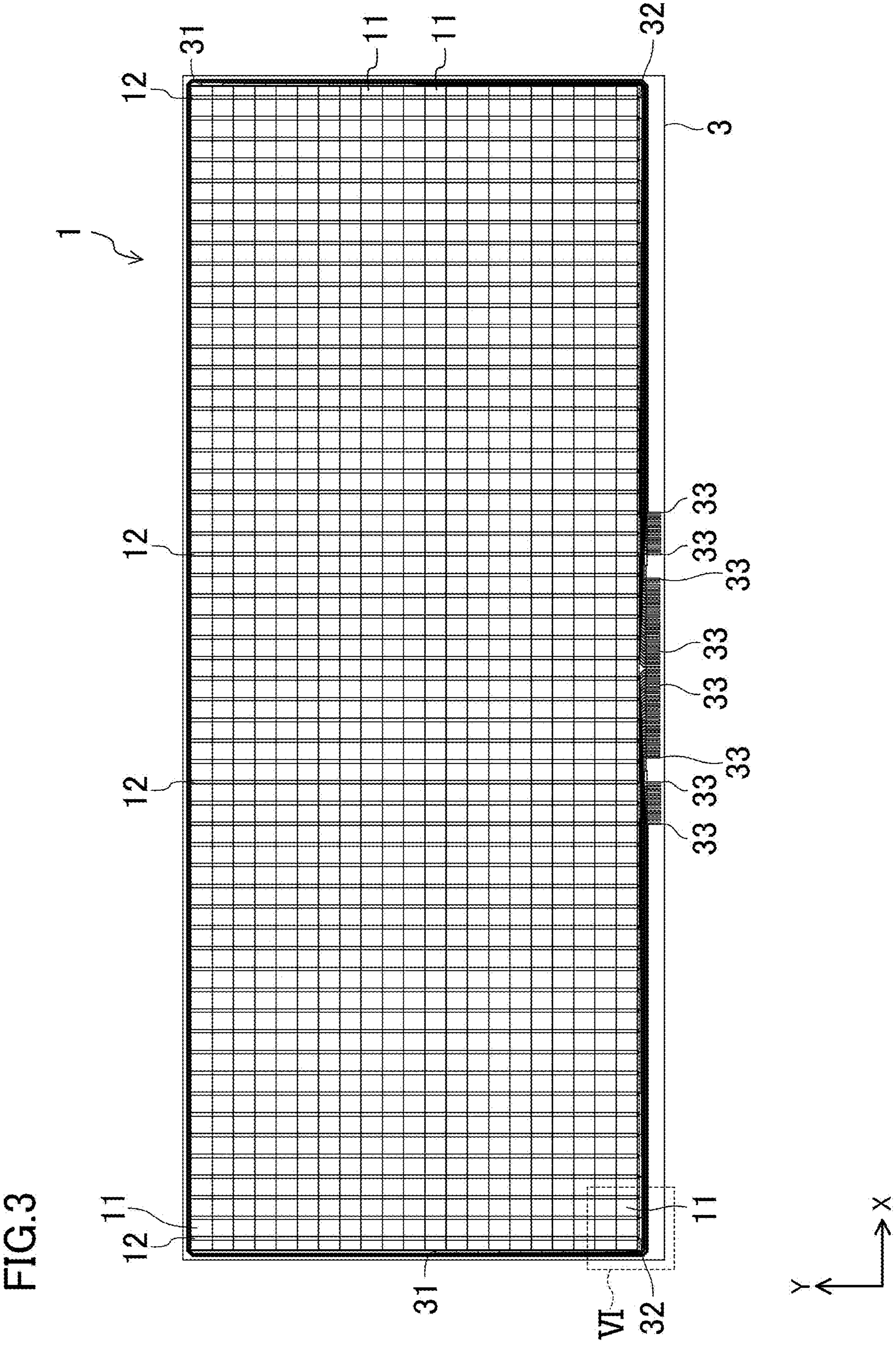
FIG. 3 is a transparent view schematically showing the touch sensor as viewed from the front surface.

As shown in FIGS. 1 and 2, the touch sensor 1 includes a light-transmissive cover member 2. The cover member 2 is a cover lens made of, for example, cover glass or plastic. The cover member 2 is in the shape of, for example, a rectangular plate in a plan view. The cover member 2 is fixed to a second layer 5 (see e.g., FIG. 10), which will be described later, of a substrate 3.

On the peripheral edge of the back surface of the cover member 2, a fringe 2*a* substantially in a frame shape is formed in a dark color such as black by screen printing or the like. The internal rectangular region surrounded by the fringe 2*a* serves as a light-transmittable view area V. That is, through the view area V, the user can obtain visual information from a display on the back side of the touch sensor 1. The front surface of the cover member 2 of the view area V serves as an operation screen 2*b* touched by a user's finger or the like in a touch operation.

(Substrate)

Figure 10:
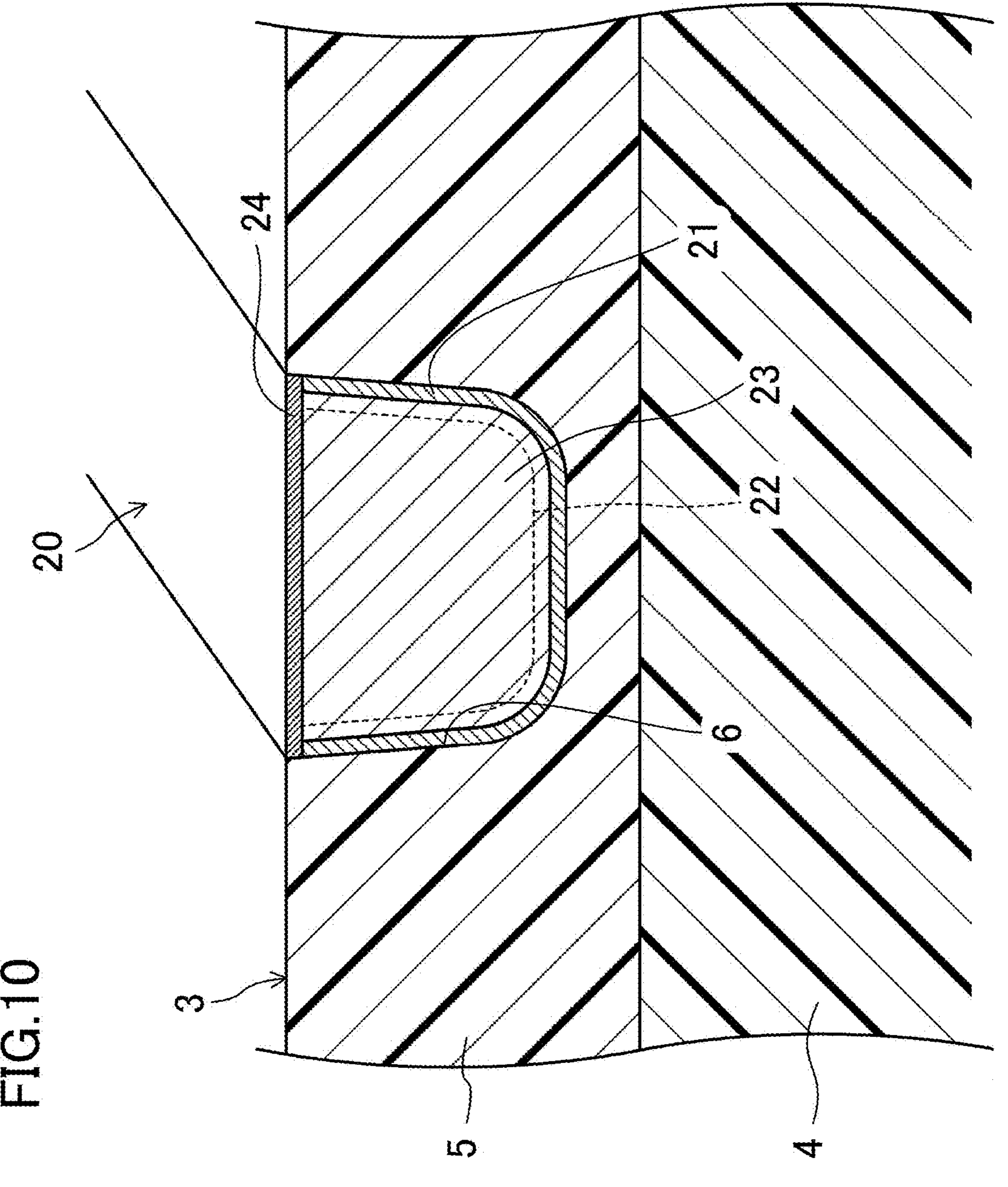
FIG. 10 is a cross-sectional view schematically showing a cross-sectional state of a fine line.

As shown in FIGS. 2 and 3, the touch sensor 1 includes one substrate 3. As shown in FIG. 10, the substrate 3 has a first layer 4 and the second layer 5. Each of the first layer 4 and the second layer 5 is formed in, for example, a substantially rectangular shape in a plan view.

The first layer 4 is made of a transparent resin material. Examples of the transparent resin material include resin materials such as polyethylene terephthalate (PET), polycarbonate, cycloolefin polymer (COP), and cycloolefin copolymer (COC).

The second layer 5 is stacked on the surface of the first layer 4. Although not shown, in this embodiment, the second layer 5 is stacked on the back surface of the first layer 4 as well. The second layer 5 is a layer for forming a plurality of grooves 6, which will be described later. The second layer 5 is made of a resin material with insulating properties and light-transmissive properties. The second layer 5 has a thickness of, for example, 1.0 μm to 10.0 μm in order to ensure flexibility. The thickness of the second layer 5 is made larger than the depth of the grooves 6, which will be described later.

The plurality of grooves 6 are provided on the surface of the second layer 5. Although not shown, the plurality of grooves 6 are provided on the back surface of the second layer 5 as well. Each groove 6 has a shape having a bottom and recessed along the thickness of the substrate 3. Each groove 6 has a depth of, for example, 0.9 μm to 3.0 μm.

(Adhesive Layer)

As shown in FIG. 2, the touch sensor 1 includes an adhesive layer 7. The adhesive layer 7 is stacked between the cover member 2 and the substrate 3. The adhesive layer 7 is made of an optical clear adhesive (OCA) having light-transmissive properties. The adhesive layer 7 has a thickness of, for example, 25 μm to 250 μm.

(Flexible Wiring Board)

As shown in FIG. 1, the touch sensor 1 includes a flexible wiring board 8. The flexible wiring board 8 is flexible and has electrical characteristics that are unchanged even in a deformed state. The flexible wiring board 8 is made of a flexible insulating film made of polyimide (PI), polyethylene terephthalate (PET), or polyethylene naphthalate (PEN), for example.

(Sensor Electrode)

The touch sensor 1 includes a plurality of sensor electrodes of capacitance type.

Figure 4:
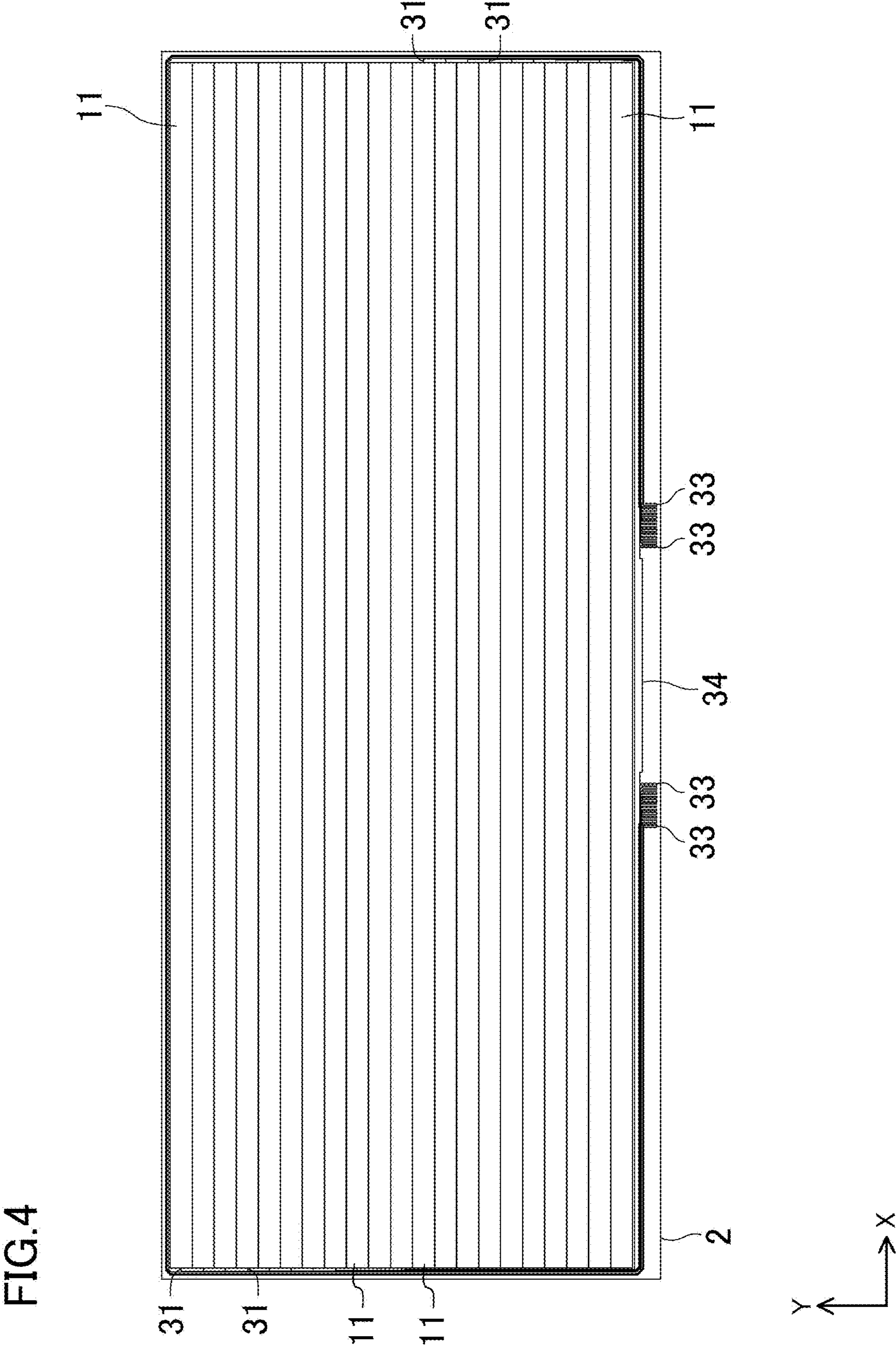
FIG. 4 is a schematic view showing transmission electrodes, first wires, and pads as viewed from the back surface of a substrate.
Figure 5:
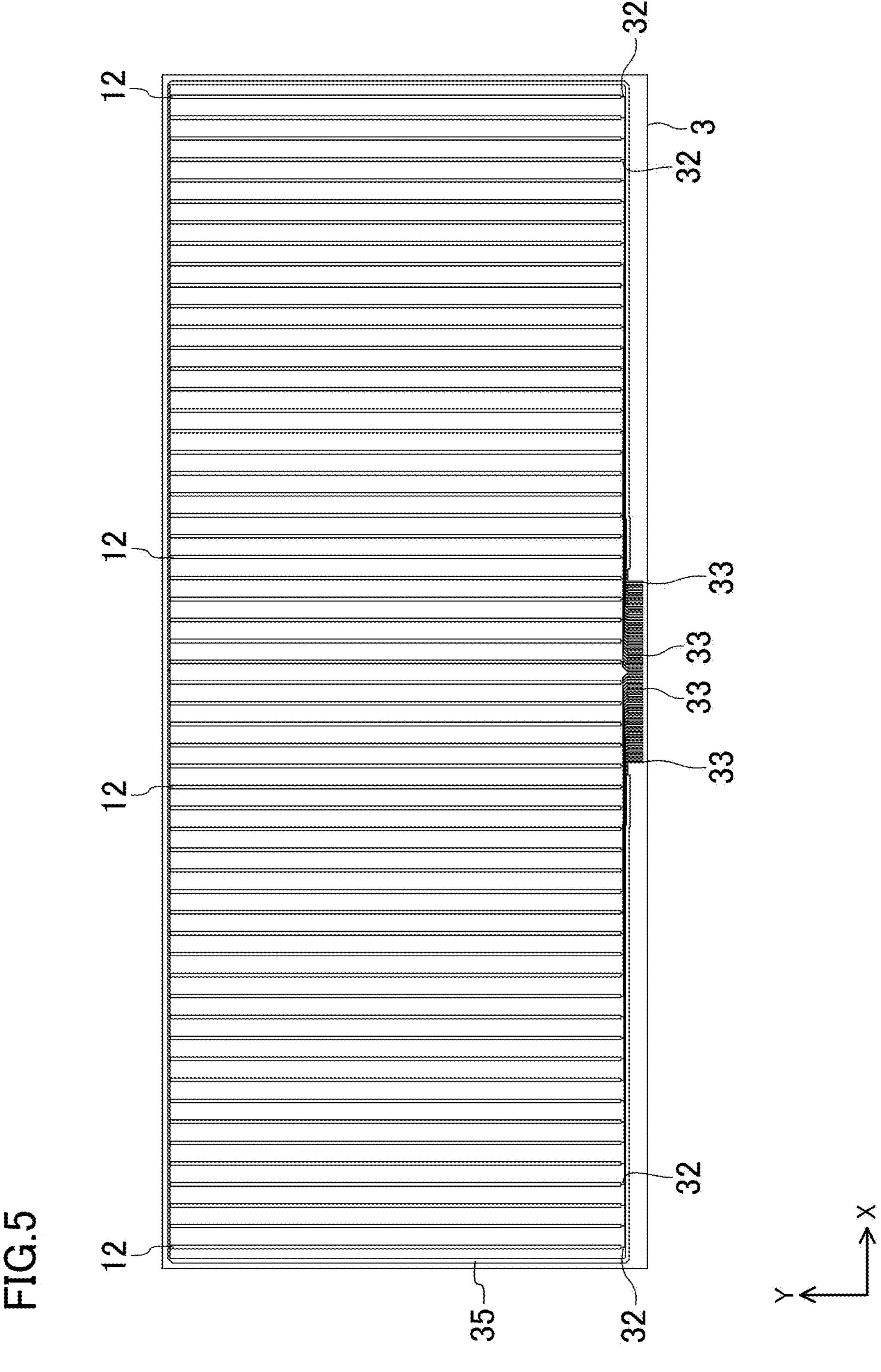
FIG. 5 is a schematic view showing reception electrodes, second wires, and pads as viewed from the front surface of the substrate.

As shown in FIGS. 3 to 5, the plurality of sensor electrodes consist of a plurality of transmission electrodes 11 and a plurality of reception electrodes 12. The plurality of transmission electrodes 11 and the plurality of reception electrodes 12 are arranged on the substrate 3, corresponding to a position of the view area V (see FIG. 1). The touch sensor 1 can detect a touch operation performed by a user's finger (a detection target) touching the operation screen 2*b* through the plurality of transmission electrodes 11 and the plurality of reception electrodes 12 positioned in the view area V.

The transmission electrodes 11 are connected to a driving circuit (not shown) via the flexible wiring board 8. Through the driving circuit, the transmission electrodes 11 radiate electric fields around. On the other hand, the reception electrodes 12 are connected to a detection circuit (not shown) via the flexible wiring board 8. The reception electrodes 12 receive electric fields radiated from the transmission electrodes 11.

As shown in FIG. 3, the transmission electrodes 11 and the reception electrodes 12 are arranged to intersect with (or be orthogonal to) each other in a plan view. A node is formed in a region in which the transmission electrode 11 and the reception electrode 12 overlap each other. This node serves as an area capable of generating capacitance.

Figure 9:
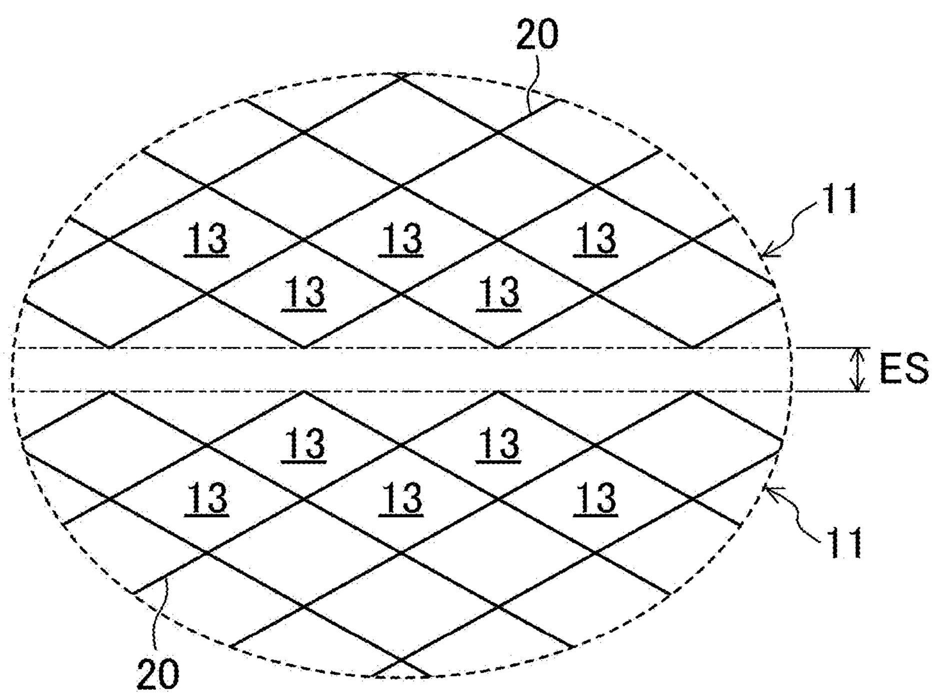
FIG. 9 is a partially enlarged view of the part IX shown in FIG. 6.
Figure 9:
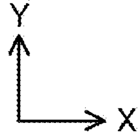

As shown in FIG. 4, the plurality of transmission electrodes 11 are provided on the back surface of the substrate 3. The transmission electrodes 11 extend in the long-side direction of the substrate 3 (the first direction X). The plurality of transmission electrodes 11 are spaced apart from each other in the short-side direction of the substrate 3 (the second direction Y). As shown in FIG. 9, a space ES between the transmission electrodes 11, 11 is set from 1 μm to 20 μm, for example.

As shown in FIG. 5, the plurality of reception electrodes 12 are provided on the front surface of the substrate 3. That is, the plurality of reception electrodes 12 are arranged on the surface of the substrate 3 that is on the viewing side of the touch sensor 1 (the surface near the operation screen 2*b* of the cover member 2). The plurality of reception electrodes 12 are insulated from the plurality of transmission electrodes 11 by the substrate 3. The reception electrodes 12 extend in the short-side direction of the substrate 3 (the second direction X). The plurality of reception electrodes 12 are spaced apart from each other in the long-side direction of the substrate 3 (the first direction Y).

Figure 6:
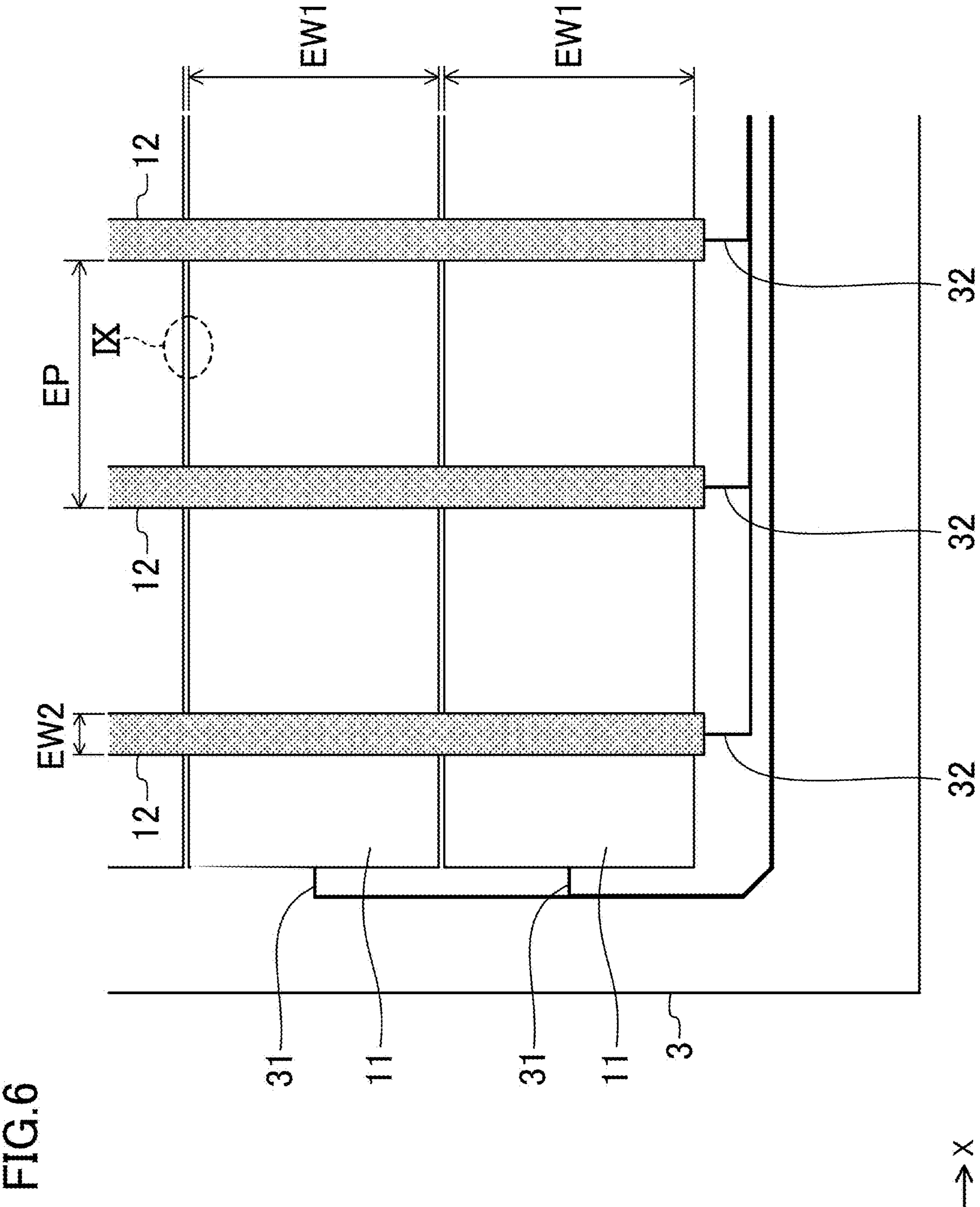
FIG. 6 is a partially enlarged view of the part VI shown in FIG. 3.

As shown in FIG. 6, a pitch EP between the reception electrodes 12, 12 in the first direction X is set to, for example, 3 mm or more and 7 mm or less. An electrode width EW2 of the reception electrode 12 is smaller than the pitch EP between the reception electrodes 12, 12. Specifically, the electrode width EW2 of the reception electrodes 12 is, for example, 0.5 mm or more. The electrode width EW2 of the reception electrode 12 is set narrower than an electrode width EW1 of the transmission electrode 11. In FIG. 6, only the reception electrodes 12 are hatched with dots to make clearly visible the overlap between the transmission electrodes 11 and the reception electrodes 12. In FIG. 6, for the sake of simple drawing, first and second ground portions 34, 35, which will be described later, are omitted.

Figure 7:
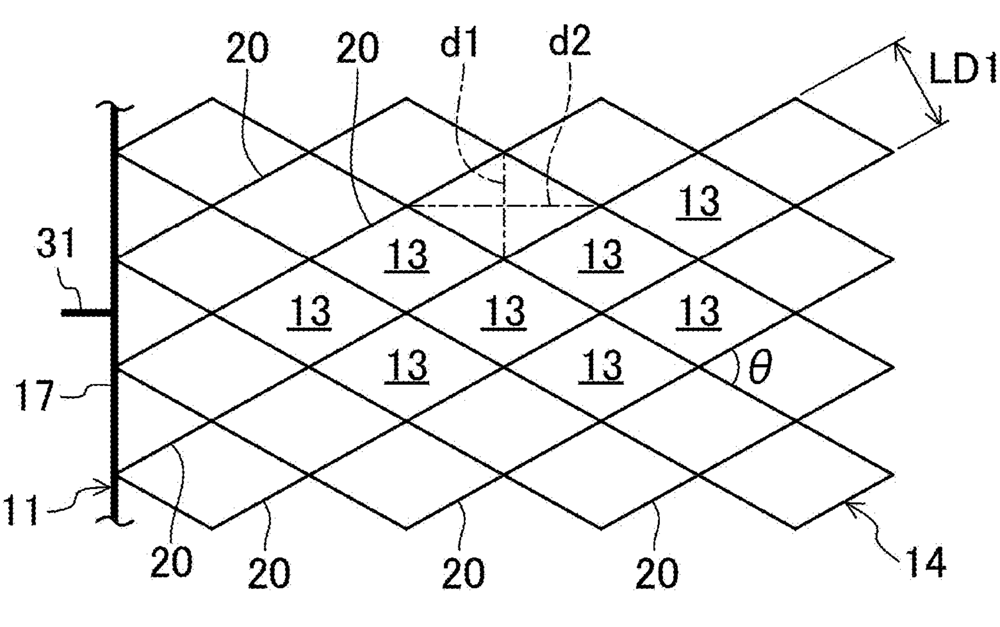
FIG. 7 schematically shows a configuration of a mesh pattern in the transmission electrode.
Figure 7:
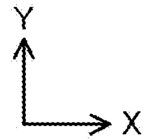
Figure 8:
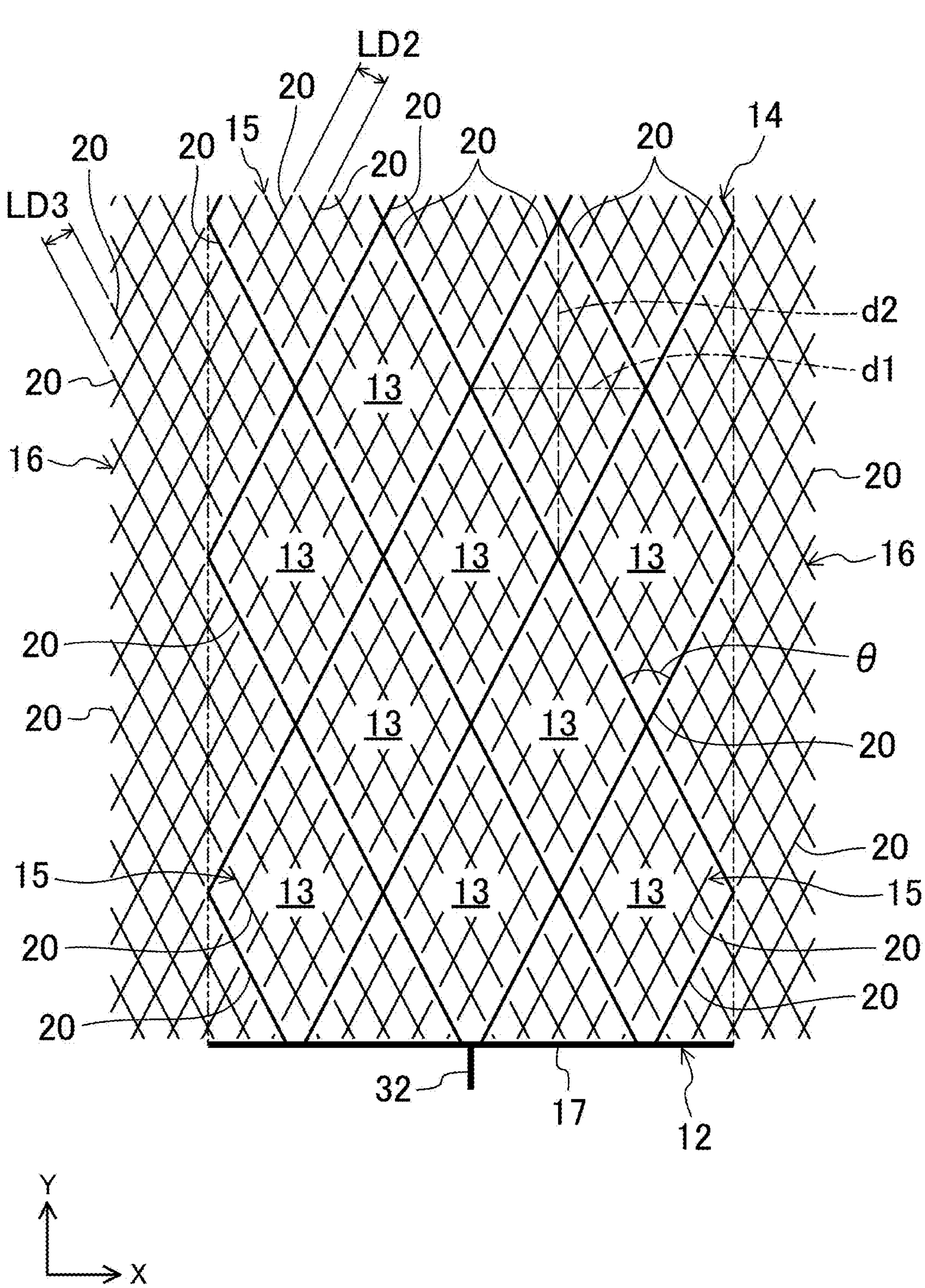
FIG. 8 schematically shows a configuration of a mesh pattern in the reception electrode and a configuration of dummy electrodes.

As shown in FIGS. 7 and 8, each of the transmission electrodes 11 and the reception electrodes 12 includes a mesh pattern 14. The mesh pattern 14 is formed so that a plurality of cells 13 formed by a plurality of fine lines 20 are arranged. The mesh patterns 14 are formed periodically by the unit of node. In FIG. 8, for the sake of visibility of the outer edge of the reception electrode 12, the position of the outer edge of the reception electrode 12 is indicated by a broken line.

Each fine line 20 is conductive. The plurality of fine lines 20 extend obliquely to each of the first direction X and the second direction Y. A specific configuration of the fine line 20 will be described later.

The fine lines 20 constituting the transmission electrodes 11 and the reception electrodes 12 have a line width of, for example, 1 μm or more and 3 μm or less. The transmission electrode 11 is configured so that a distance LD1 between the fine lines 20, 20 adjacent to each other is in the range of 100 μm to 500 μm. Preferably, the distance LD1 is substantially equal to a distance LD2 and a distance LD3, which will be described later.

Each cell 13 has a quadrangular shape. The quadrangular shape is formed by first and second imaginary diagonals d1 and d2. The second diagonal d2 is set longer than the first diagonal d1. In this embodiment, the quadrangular shape is a rhombus. The acute angle θ of the rhombus is set to the range of, for example, 50° to 70°. More preferably, the acute angle θ is in the range of 50° to 58°. In this embodiment, the cells 13 constituting the reception electrodes 12 (see FIG. 8) are made larger than the cells 13 constituting the transmission electrodes 11 (see FIG. 7).

As shown in FIG. 8, the reception electrode 12 includes dummy patterns 15. In a plan view, the dummy pattern 15 is located inside each cell 13 constituting the reception electrode 12.

The dummy pattern 15 consists of the plurality of fine lines 20. Specifically, the dummy pattern 15 is configured as a mesh pattern formed by arranging a plurality of cells formed by the plurality of fine lines 20. The dummy pattern 15 is configured so that the distance LD2 between the fine lines 20, 20 adjacent to each other is in the range of 100 μm to 500 μm.

The dummy pattern 15 is electrically insulated from the plurality of fine lines 20 constituting the cell 13. Specifically, ends of the fine lines 20 constituting the dummy pattern 15 are spaced apart from the plurality of fine lines 20 constituting the cells 13 of the reception electrodes 12. That is, the fine lines 20 constituting the dummy pattern 15 do not intersect with the plurality of fine lines 20 constituting the reception electrodes 12. The fine lines 20 constituting the dummy pattern 15 are electrically insulated from an electrode connection part 17, which will be described later.

A dummy electrode 16 is provided between the reception electrodes 12, 12. The dummy electrode 16 consists of a plurality of fine lines 20. Specifically, the dummy electrode 16 is configured as a mesh pattern formed by arranging a plurality of cells formed by the plurality of fine lines 20. The dummy electrode 16 is configured so that the distance LD3 between the fine lines 20, 20 adjacent to each other is in the range of 100 μm to 500 μm. Preferably, the distance LD3 is substantially equal to the distance LD1 and the distance LD2.

The dummy electrode 16 is electrically insulated from the reception electrodes 12. Specifically, ends of the fine lines 20 constituting the dummy electrode 16 are spaced apart from the plurality of fine lines 20 constituting the cells 13 of the reception electrodes 12. That is, the fine lines 20 constituting the dummy electrode 16 do not intersect with the plurality of fine lines 20 constituting the reception electrodes 12. The fine lines 20 constituting the dummy electrode 16 are electrically insulated from an electrode connection part 17, which will be described later.

Each of the transmission electrodes 11 and the reception electrodes 12 includes the electrode connection part 17. The electrode connection part 17 consists of a fine line similar to the fine lines 20. The electrode connection part 17 is located near the end of each of the transmission electrodes 11 and the reception electrodes 12. The electrode connection part 17 is electrically connected to the plurality of fine lines 20 constituting the cell 13. The line width of the electrode connection part 17 is greater than the line width of the plurality of fine lines 20 constituting the cell 13.

(Characteristic Configuration)

As a characteristic configuration according to the embodiment of the present disclosure, the sensor electrode is configured so that the second diagonal d2 of each cell 13 extends in the extending direction of the sensor electrode.

As shown in FIG. 7, in the transmission electrode 11, the second diagonal d2 of each cell 13 extends in the first direction X. That is, in the transmission electrode 11, the relatively longer second diagonal d2 of each cell 13 is along the first direction X. With this configuration, in the transmission electrode 11, the number of cells 13 arranged in the extending direction of the transmission electrodes 11 (the first direction X) is smaller in comparison with the configuration not included in the present disclosure (i.e., the configuration in which the shorter first diagonal d1 is along the first direction X (not shown)). More specifically, in the embodiment of the present disclosure, the number of intersections between the fine lines 20, 20 in the extending direction of the transmission electrodes 11 is smaller in comparison with the configuration not included in the present disclosure.

As shown in FIG. 8, in the reception electrode 12, the second diagonal d2 of each cell 13 extends in the second direction Y. That is, in the reception electrode 12, the relatively longer second diagonal d2 of each cell 13 is along the second direction Y. With this configuration, in the reception electrode 12, the number of cells 13 arranged in the extending direction of the reception electrode 12 (the second direction Y) is smaller in comparison with the configuration not included in the present disclosure (i.e., the configuration in which the shorter first diagonal d1 is along the second direction Y (not shown)). More specifically, in the embodiment of the present disclosure, the number of intersections between the fine lines 20, 20 in the extending direction of the reception electrodes 12 is smaller in comparison with the configuration not included in the present disclosure.

(Specific Configuration of Fine Line)

The fine line 20 includes conductive materials buried in the groove 6. As shown in FIG. 10, the fine line 20 consists of, for example, an adhesive layer 21, a conductive layer 22, a plating layer 23, and a blackened layer 24.

The adhesive layer 21 is an element for ensuring the adhesiveness of the conductive layer 22 to the groove 6. The adhesive layer 21 has a function of making the fine lines 20 less visible when viewed by the user from the operation screen 2*b* side.

The adhesive layer 21 is, for example, a metal layer made of a metal nitride or a metal oxide containing at least one metal selected from the group consisting of Ti, Al, V, W, Ta, Si, Cr, Ag, Mo, Cu, and Zn. The adhesive layer 21 may be a single layer or a multilayer obtained by stacking a plurality of layers with different compositions. The adhesive layer 21 is stacked as a thin film on the groove 6 by vapor deposition or sputtering, for example.

The conductive layer 22 has a function of improving the adhesiveness between the adhesive layer 21 and the plating layer 23. Specifically, for example, when electroplating for forming the plating layer 23 is conducted, the conductive layer 22 functions as a cathode for depositing a plating solution, which will be described later, containing copper (Cu) in this embodiment on the adhesive layer 21. The conductive layer 22 is stacked as a thin film on the adhesive layer 21 by vapor deposition or sputtering, for example.

The plating layer 23 is formed by electroplating, for example. If electroplating is conducted, the conductive layer 22 and the plating layer 23 are formed integrally. Accordingly, the interface between the conductive layer 22 and the plating layer 23 is unidentifiable.

The blackened layer 24 is stacked on a surface of the plating layer 23. The blackened layer 24 is formed by crystal grains of copper being substituted with palladium (by blackening), where the crystal grains of copper are located at boundaries between the crystal grains of copper located on the surface of the plating layer 23. The blackened layer 24 has a thickness of, for example, 7 nm to 10 nm. The blackened layer 24 has a function of making the fine lines 20 less visible when viewed by the user from the operation screen 2*b* side.

(Wire)

The touch sensor 1 includes a plurality of wires. The plurality of wires are elements for electrically connecting the plurality of transmission electrodes 11 and the plurality of reception electrodes 12 with external circuits (the driving circuit and the detection circuit described above)(not shown). The wire consists of a fine line similar to the fine line 20.

As shown in FIGS. 3 to 5, the plurality of wires includes a plurality of first wires 31 and a plurality of second wires 32. The plurality of first wires 31 and the plurality of second wires 32 are located outside the view area V (see FIG. 1). Specifically, the plurality of first wires 31 and the plurality of second wires 32 overlap the fringe 2*a* (see FIGS. 1 and 2) in a plan view when viewed from the operation screen 2*b* side. That is, the plurality of first wires 31 and the plurality of second wires 32 are invisible from the operation screen 2*b* side due to the fringe 2*a*.

As shown in FIG. 4, the plurality of first wires 31 are formed on the back surface of the substrate 3. One end of the first wire 31 is electrically connected to an end of the transmission electrode 11 (i.e., to the electrode connection part 17). The plurality of first wires 31 are arranged so that the other end of the first wire 31 converges at the substantial center of the lower side of the substrate 3.

The plurality of second wires 32 are formed on the front surface of the substrate 3. One end of the second wire 32 is electrically connected to an end of the reception electrode 12 (i.e., to the electrode connection part 17). The plurality of second wires 32 are arranged so that the other end of the second wire 32 converges at the substantial center of the lower side of the substrate 3.

(Pad)

As shown in FIGS. 3 to 5, the other end of each wire is provided with a pad 33 that is to be electrically connected with the flexible wiring board 8. The pad 33 consists of a fine line similar to the fine line 20.

(First and Second Ground Portions)

As shown in FIGS. 4 and 5, the touch sensor 1 includes first and second ground portions 34 and 35 set to a ground potential. The first and second ground portions 34 and 35 are electrically insulated from the plurality of sensor electrodes and the plurality of wires. The first and second ground portions 34 and 35 are located outside the view area V (see FIG. 1). Specifically, the first and second ground portions 34 and 35 are located to surround the outer periphery of the view area V.

As shown in FIG. 4, the first ground portion 34 is formed on the back surface of the substrate 3. The first ground portion 34 is located near the peripheral edge of the back surface of the substrate 3. The pads 33, 33 described above are provided at an intermediate portion of the first ground portion 34 (an intermediate portion near the substantial center of the lower side of the substrate 3).

As shown in FIG. 5, the second ground portion 35 is formed on the front surface of the substrate 3. The second ground portion 35 is located near the peripheral edge of the front surface of the substrate 3. Both ends of the second ground portion 35 are located near the substantial center of the lower side of the substrate 3. Both ends of the first ground portion 34 are provided with the above-described pads 33, 33.

[Advantages of Embodiment]

As described above, the cell 13 has a quadrangular shape formed by the first imaginary diagonal d1 and the second imaginary diagonal d2 longer than the first diagonal d1. As a characteristic configuration according to the embodiment of the present disclosure, the sensor electrode is configured so that the second diagonal d2 extends in the extending direction of the sensor electrode. Specifically, in the transmission electrode 11, the second diagonal d2 of each cell 13 extends in the first direction X, whereas in the reception electrode 12, the second diagonal d2 of each cell 13 extends in the second direction Y. With this configuration, in the transmission electrode 11, the number of cells 13 arranged in the first direction X (the extending direction of the transmission electrodes 11) is relatively smaller, whereas in the reception electrode 12, the number of cells 13 arranged in the second direction Y (the extending direction of the reception electrode 12) is relatively smaller. That is, in the touch sensor 1, the number of intersections between the fine lines 20, 20 in the extending direction of each of the transmission electrodes 11 and the reception electrodes 12 is relatively smaller. As a result, the conductive paths in the extending direction of each of the transmission electrodes 11 and the reception electrodes 12 is relatively reduced. Accordingly, in the touch sensor 1, the resistance values of both the transmission electrodes 11 and the reception electrodes 12 can be lowered. That is, the resistance value of each sensor electrode can be lowered.

Here, for example, if the touch sensor 1 is applied to a large display with a horizontally long screen (e.g., a horizontally long screen with an aspect ratio of 21:9) which is horizontally long when viewed from the user, it is inevitable that the transmission electrodes 11 are long in the first direction X shown in the drawings. Even in this case, with the above-described characteristic configuration of the touch sensor 1, the resistance value of the transmission electrodes 11 in particular can be reduced. That is, the touch sensor 1 according to the embodiment of the present disclosure is suitable for the above-described large display.

In addition, with the above-described characteristic configuration, the resistance values of both the transmission electrodes 11 and the reception electrodes 12 can be reduced, and thus the sensor sensitivities of the transmission electrodes 11 and the reception electrodes 12 are improved. That is, the electrical characteristics of the touch sensor 1 are improved.

Further, with the above-described characteristic configuration, an irregular pattern is formed in a plan view in a state in which the plurality of fine lines 20 constituting the transmission electrodes 11 and the plurality of fine lines 20 constituting the reception electrodes 12 overlap each other. As a result, the plurality of fine lines 20 constituting the transmission electrodes 11 and the reception electrodes 12 are less visible when viewed by the user of the touch sensor 1 from the operation screen 2*b* side. That is, the so-called "visible lines" of the plurality of fine lines 20 are reduced. Accordingly, the appearance of the touch sensor 1 can be improved.

The quadrangular shape of the cell 13 is a rhombus with an acute angle θ that is set in the range of 50° to 70°. Specifically, if the acute angle θ of the quadrangular shape is set to 50°, the length of the second diagonal d2 is about 2.14 times the length of the first diagonal d1. On the other hand, if the acute angle θ of the quadrangular shape is set to 70°, the length of the second diagonal d2 is about 1.22 times the length of the first diagonal d1. That is, the second diagonal d2 is 1.22 to 2.14 times the length of the first diagonal d1. Accordingly, the resistance values of both the transmission electrodes 11 and the reception electrodes 12 can be reduced.

Further, the quadrangular shape of the cell 13 may be a rhombus with an acute angle θ that is set in the range of 50° to 58°. If the acute angle θ of the quadrangular shape is set to 58°, the length of the second diagonal d2 is about 1.80 times the length of the first diagonal d1. That is, if the acute angle θ is in the range of 50° to 58°, the second diagonal d2 is 1.80 to 2.14 times the length of the first diagonal d1.

The transmission electrode 11 is configured so that the distance LD1 between the fine lines 20, 20 adjacent to each other is in the range of 100 μm to 500 μm. With this configuration, while the quadrangular shape of the cell 13 formed by the plurality of fine lines 20 maintains a predetermined size, the fine lines 20 are less visible when viewed by the user of the touch sensor 1 from the operation screen 2*b* side. That is, "visible lines" are reduced, and the appearance of the touch sensor 1 can be improved.

If the line width of the fine line 20 is 1 μm or more and 3 μm or less, the plurality of fine lines 20 are less visible when viewed by the user of the touch sensor 1 from the operation screen 2*b* side. That is, "visible lines" are reduced. Further, in this embodiment, the pitch EP between the reception electrodes 12, 12 is 3 mm or more and 7 mm or less. The electrode width EW2 of the reception electrode 12 is 0.5 mm or more and is smaller than the pitch EP between the reception electrodes 12, 12. Further, the pitch between the transmission electrodes 11, 11 is in the range of 1 μm to 20 μm. With this configuration, the pitch between the transmission electrodes 11, 11 and the pitch between the reception electrodes 12, 12 are also less visible when viewed by the user of the touch sensor 1 from the operation screen 2*b* side. As a result, the appearance of the touch sensor 1 can be improved.

The mesh patterns 14 are formed periodically by the unit of node. With this configuration, any nodes formed by the plurality of fine lines 20 constituting the transmission electrodes 11 and the plurality of fine lines 20 constituting the reception electrodes 12 overlapping each other have a uniform shape. That is, all the nodes are uniform in capacitance change. As a result, the sensitivity of the touch sensor 1 can be stabilized.

The reception electrodes 12 include the dummy patterns 15 electrically insulated from the plurality of fine lines 20 constituting the reception electrodes 12. This dummy pattern 15 can reduce a rise in the capacitance value of each reception electrode 12. By the dummy patterns 15 being provided, the plurality of fine lines 20 constituting the reception electrodes 12 are less distinguishable from the dummy patterns 15 when viewed by the user of the touch sensor 1 from the operation screen 2*b* side. That is, the plurality of fine lines 20 constituting the reception electrodes 12 are less noticeable from the operation screen 2*b* side. As a result, the appearance of the touch sensor 1 can be improved.

The dummy electrode 16 electrically insulated from the reception electrodes 12 is provided between the reception electrodes 12, 12. This dummy electrode 16 can reduce a rise in the capacitance values of the reception electrodes 12, 12 adjacent to each other. By the dummy electrode 16 being positioned between the reception electrodes 12, 12, the reception electrodes 12 are less noticeable when viewed by the user of the touch sensor 1 from the operation screen 2*b* side. As a result, the appearance of the touch sensor 1 can be improved.

The dummy pattern 15 is configured so that the distance LD2 between the fine lines 20, 20 adjacent to each other is in the range of 100 μm to 500 μm. Similarly, the dummy electrode 16 is also configured so that the distance LD3 between the fine lines 20, 20 adjacent to each other is in the range of 100 μm to 500 μm. With this configuration, the plurality of fine lines 20 constituting the dummy patterns 15 and the dummy electrodes 16 are less visible when viewed by the user of the touch sensor 1 from the operation screen 2*b* side. Therefore, "visible lines" are reduced, and the appearance of the touch sensor 1 can be improved.

Other Embodiments

In the above embodiment, the view area V that is substantially rectangular is used, but the configuration is not limited thereto. The view area V may be, for example, in a substantially circular shape or a polygonal shape such as a pentagonal shape in a plan view.

In the above embodiment, one substrate 3 is employed, but the configuration is not limited thereto. That is, two substrates may be employed. Although not shown, two substrates may be used with a second layer stacked on the front surface or the back surface of a first layer.

In the above embodiment, the substrate 3 includes the first layer 4 and the second layer 5, but the configuration is not limited thereto. For example, the substrate 3 may include only the first layer 4. In this case, the plurality of grooves 6 and the plurality of fine lines 20 only have to be formed on at least one of the front surface or the back surface of the first layer 4.

In the above embodiment, the direction from left to right in FIG. 3 is defined as the first direction X, and the direction from bottom to top in FIG. 3 is defined as the second direction Y, but the configuration is not limited thereto. That is, the direction from bottom to top in FIG. 3 may be defined as the first direction X, and the direction from left to right in FIG. 3 may be defined as the second direction Y. In this case, although not shown, the extending direction of the transmission electrodes 11 and the second diagonal d2 of the cells 13 constituting the transmission electrodes 11 are the direction from bottom to top in FIG. 3. On the other hand, the extending direction of the reception electrodes 12 and the second diagonal d2 of the cells 13 constituting the reception electrodes 12 are the direction from left to right in FIG. 3.

In the above embodiment, the plurality of transmission electrodes 11, the plurality of first wires 31, and the first ground portion 34 are provided on the back surface of the substrate 3, and the plurality of reception electrodes 12, the plurality of second wires 32, and the second ground portion 35 are provided on the front surface of the substrate 3, but the configuration is not limited thereto. For example, although not shown, the plurality of transmission electrodes 11, the plurality of first wires 31, and the first ground portion 34 may be provided on the front surface of the substrate 3, and the plurality of reception electrodes 12, the plurality of second wires 32, and the second ground portion 35 may be provided on the back surface of the substrate 3. Even in this configuration, the dummy patterns 15 and the dummy electrodes 16 are located on the front surface of the substrate 3 (the surface of the substrate 3 that is on the viewing side of the touch sensor 1).

In the above embodiment, the touch sensor 1 where the cover member 2 and the flexible wiring board 8 are attached to the substrate 3 is shown, but the configuration is not limited thereto. Specifically, the concept of the touch sensor 1 of the present disclosure includes the state in which the cover member 2, the flexible wiring board 8, and the like have not been attached to the substrate 3 yet. Further, the concept of the touch sensor 1 of the present disclosure includes a configuration in which the transmission electrodes 11, the reception electrodes 12, the first wires 31, the second wires 32, and the plurality of pads 33 are formed on an original elongated base material (e.g., an elongated hoop-shaped member (not shown)) from which individual substrates 3 are formed.

In the above embodiment, the shape of the cell 13 is a rhombus, but the configuration is not limited thereto. That is, the cell 13 only has to have a quadrangular shape formed by the first imaginary diagonal d1 and the second imaginary diagonal d2 longer than the first diagonal d1.

In the above embodiment, the transmission electrodes 11 do not include the dummy patterns 15, but the configuration is not limited thereto. That is, the transmission electrodes 11 may include dummy patterns (not shown) similar to the dummy patterns 15 of the above embodiment. In this case, similar to the dummy patterns 15 on the reception electrodes 12, the dummy patterns on the transmission electrodes 11 are formed by a plurality of fine lines (not shown). Further, in a plan view, the dummy pattern on the transmission electrodes 11 is located inside each of the cells 13 constituting the transmission electrodes 11.

In the above embodiment, the dummy electrode 16 is not provided between the transmission electrodes 11, 11, but the configuration is not limited thereto. For example, if the width EW1 of the transmission electrodes 11 is relatively small, a dummy electrode (not shown) may be provided between the transmission electrodes 11, 11. This dummy electrode is formed by a plurality of fine lines (not shown) similarly to the dummy electrode 16 shown in FIG. 8.

In the above embodiment, the plating solution containing copper (Cu) as a main component is shown, but the configuration is not limited thereto. For example, the plating solution may contain silver, gold, or a copper alloy.

INDUSTRIAL APPLICABILITY

The present disclosure is industrially applicable as a touch sensor that can be applied to a large display in particular.

DESCRIPTION OF REFERENCE CHARACTERS

1 Touch Sensor
2 Cover Member
3 Substrate
11 Transmission Electrode
12 Reception Electrode
13 Cell
14 Mesh Pattern
15 Dummy Pattern
16 Dummy Electrode
17 Electrode Connection Part
20 Fine Line
31 First Wire
32 Second Wire
33 Pad
34 First Ground Portion
35 Second Ground Portion
d1 First Diagonal
d2 Second Diagonal

The invention claimed is:

1. A touch sensor comprising a plurality of sensor electrodes, wherein:

the plurality of sensor electrodes include a plurality of transmission electrodes extending in a first direction, and a plurality of reception electrodes extending in a second direction orthogonal to the first direction and arranged to intersect with the plurality of transmission electrodes, each of the plurality of transmission electrodes and the plurality of reception electrodes includes a mesh pattern formed by arranging a plurality of cells formed by a plurality of fine lines that are conductive, each of the plurality of cells has a quadrangular shape formed by a first imaginary diagonal and a second imaginary diagonal longer than the first diagonal, the sensor electrodes are configured so that the second diagonal extends in an extending direction of the sensor electrodes, the plurality of fine lines have a line width of 1 μm or more and 3 μm or less, a pitch between the plurality of reception electrodes is 3 mm or more to 7 mm or less, the plurality of reception electrodes have an electrode width that is 0.5 mm or more and that is smaller than the pitch of the plurality of reception electrodes, and a pitch between the plurality of transmission electrodes is in a range of 1 μm to 20 μm.

2. The touch sensor of claim 1, wherein a plurality of mesh patterns are formed periodically by a unit of node.

* * * * *